United States Patent
Kwon et al.

(10) Patent No.: US 10,068,353 B2
(45) Date of Patent: Sep. 4, 2018

(54) METHOD AND APPARATUS FOR PROCESSING COMPRESSED TEXTURE

(71) Applicant: Samsung Electronics Co., Ltd., Suwon-si (KR)

(72) Inventors: Sunmin Kwon, Seoul (KR); Hoyoung Kim, Seoul (KR); Jeongae Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 31 days.

(21) Appl. No.: 15/272,732

(22) Filed: Sep. 22, 2016

(65) Prior Publication Data

US 2017/0084055 A1 Mar. 23, 2017

(30) Foreign Application Priority Data

Sep. 22, 2015 (KR) ........................ 10-2015-0133886

(51) Int. Cl.
*G06T 15/04* (2011.01)
*G06T 15/80* (2011.01)
*G06T 17/10* (2006.01)
*G06T 9/00* (2006.01)

(52) U.S. Cl.
CPC ............... *G06T 9/00* (2013.01); *G06T 15/04* (2013.01)

(58) Field of Classification Search
None
See application file for complete search history.

(56) References Cited

U.S. PATENT DOCUMENTS

| 8,774,534 B2 | 7/2014 | Zarom |
| 2006/0126121 A1 | 6/2006 | Chung |
| 2012/0201305 A1 | 8/2012 | Duvivier |
| 2012/0281005 A1 | 11/2012 | Nystad et al. |
| 2013/0084018 A1 | 4/2013 | Nystad |

FOREIGN PATENT DOCUMENTS

| KR | 10-0648923 B1 | 11/2006 |
| KR | 10-0781833 B1 | 12/2007 |
| KR | 10-1085622 B1 | 11/2011 |

OTHER PUBLICATIONS

James Chen, "Image Compression with SVD", downloaded @http://fourier.eng.hmc.edu/e161/lectures/svdcompression.html, published Dec. 13, 2000.*
European Extened Search Report dated Jan. 4, 2017 for European Patent Application No. 16190155.8.

* cited by examiner

*Primary Examiner* — Yingchun He
(74) *Attorney, Agent, or Firm* — F. Chau & Associates, LLC

(57) ABSTRACT

A method of compressing a texture includes receiving a texel block obtained by dividing texels forming a texture into units of blocks of texels, determining a block pattern of the texel block, and compressing the texel block based on the block pattern.

18 Claims, 13 Drawing Sheets

METHOD AND APPARATUS FOR PROCESSING COMPRESSED TEXTURE

CROSS-REFERENCE TO RELATED APPLICATIONS

This application claims the benefit under 35 USC 119(a) of Korean Patent Application No. 10-2015-0133886 filed on Sep. 22, 2015, in the Korean Intellectual Property Office, the entire disclosure of which is incorporated herein by reference for all purposes.

BACKGROUND

1. Field

This application relates to a method and an apparatus for processing a compressed texel block.

2. Description of Related Art

When a three-dimensional (3D) graphics frame is rendered, a large amount of calculations are required, and thus much power and many hardware resources are needed. Accordingly, when 3D graphics rendering is performed, it is important to reduce the amount of calculations.

To reduce the amount of calculations and accelerate a rendering speed in a pixel shading process of a 3D graphics rendering process, a graphics processing unit (GPU) is equipped with a texture processor.

The texture processor generates a texture needed for texturing. Texturing is a process of mapping an object formed in a 3D space to a previously prepared image, which is an important operation in the 3D graphics rendering process to reduce the amount of calculations. The previously prepared image is referred to as a texture. A texture may be previously prepared in a compressed form and stored in an external memory of the texture processor.

The texture processor receives a compressed texel block, in which texels forming a texture are compressed in units of blocks, from the external memory, processes the received compressed texel block to obtain a texture requested by a shader core, and transmits the texture to the shader core.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of compressing a texture includes receiving a texel block obtained by dividing texels forming a texture into units of blocks of texels; determining a block pattern of the texel block; and compressing the texel block based on the block pattern.

The block pattern may be a pattern for classifying texels forming the texel block into first texels whose weights or indexes are to be calculated and second texels whose weights or indexes are not to be calculated.

The determining of the block pattern of the texel block may include calculating a difference value between texel values of the first texels and texel values of the second texels for each of a plurality of block patterns; and determining a block pattern having a smallest difference value among the plurality of block patterns to be the block pattern of the texel block.

The compressing of the texel block may include determining at least one representative value of the texels forming the texel block; and calculating weights or indexes of the first texels based on the at least one representative value.

The compressing of the texel block may further include generating compressed data including the block pattern, the at least one representative value, and the weights or indexes of the first texels.

The generating of the compressed data may include generating the compressed data by allotting data bits to indicate the block pattern, the at least one representative value, and the weights or indexes of the first pixels; and allotting additional data bits that would have been allotted to indicate weights or indexes of at least some of the second texels had the weights or indexes of the second texels been calculated to any one or any combination of any two or more of the data bits indicating the block pattern, the data bits indicating the at least one representative value, and the data bits indicating the weights or indexes of the first texels.

Texels forming the texel block may have symmetrical properties in the block pattern.

In another general aspect, a non-transitory computer-readable storage medium stores instructions that, when executed by a processor, cause the processor to perform the method described above.

In another general aspect, a method of processing a texture includes receiving compressed data obtained by compressing texels forming a texture in units of blocks of texels; extracting a block pattern included in the compressed data; and obtaining texels forming a texel block by decompressing the compressed data based on the block pattern.

The block pattern may be a pattern for classifying the texels forming the texel block into first texels and second texels.

The obtaining of the texels may include obtaining at least one representative value of the texels forming the texel block and weights or indexes of the first texels based on the compressed data; obtaining texel values of the first texels based on the block pattern, the at least one representative value, and the weights or indexes of the first texels; and obtaining texel values of the second texels based on the block pattern and the texel values of the first texels.

The obtaining of the texel values of the second texels may include obtaining each one of the texel values of the second texels by replicating one of the texel values of the first texels based on the block pattern.

In another general aspect, a non-transitory computer-readable storage medium stores instructions that, when executed by a processor, cause the processor to perform the method described above.

In another general aspect, an apparatus for compressing a texture includes a block pattern determiner configured to receive a texel block obtained by dividing texels forming a texture into units of blocks of texels, and determine a block pattern of the texel block; and a compressor configured to compress the texel block based on the block pattern.

The block pattern may be a pattern for classifying texels forming the texel block into first texels whose weights or indexes are to be calculated and second texels whose weights or indexes are not to be calculated.

The block pattern determiner may be further configured to calculate a difference value between texel values of the first texels and texel values of the second texels for each of a plurality of block patterns, and determine a block pattern having a smallest difference value among the plurality of block patterns to be the block pattern of the texel block.

The compressor may be further configured to determine at least one representative value of the texels forming the texel block, and calculate weights or indexes of the first texels based on the at least one representative value.

The compressor may be further configured to generate compressed data including the block pattern, the at least one representative value, and the weights or indexes of the first texels.

The compressor may be further configured to generate the compressed data by allotting data bits to indicate the block pattern, the at least one representative value, and the weights or indexes of the first pixels, and allotting additional data bits that would have been allotted to indicate weights or indexes of at least some of the second texels had the weights or indexes of the second texels been calculated to any one or any combination of any two or more of the data bits indicating the block pattern, the data bits indicating the at least one representative value, and the data bits indicating the weights or indexes of the first texels.

Texels forming the texel block may have symmetrical properties in the block pattern.

In another general aspect, a texture processor includes a block pattern extractor configured to receive compressed data obtained by compressing texels forming a texture in units of blocks of texels, and extract a block pattern included in the compressed data; and a decompressor configured to obtain texels forming a texel block by decompressing the compressed data based on the block pattern.

The block pattern may be a pattern for classifying the texels forming the texel block into first texels and second texels.

The decompressor may be further configured to obtain at least one representative value of the texels forming the texel block and weights or indexes of the first texels based on the compressed data, obtain texel values of the first texels based on the block pattern, the at least one representative value, and the weights or indexes of the first texels, and obtain texel values of the second texels based on the block pattern and the texel values of the first texels.

The decompressor may be further configured to obtain each one of texel values of the second texels by replicating one of the texel values of the first texels based on the block pattern.

In another general aspect, a method of compressing a texture includes receiving a texel block obtained by dividing texels forming a texture into units of blocks of texels; obtaining general texel data applicable to all of texels forming the texel block; obtaining specific texel data applicable to only first texels among first texels and second texels into which the texel block is divided; and compressing the texel block based on the general texel data and the specific texel data.

The general texel data and the specific texel data may enable texel values of all of the first texels and the second texels to be obtained based on the general texel data and the specific texel data.

The general texel data may include spatial data representing a spatial relationship between the first texels and the second texels in the texel block.

The spatial data may include a block pattern indicating locations of the first texels and the second texels in the texel block.

The spatial data may include information for each of the second texels indicating which one of the first texels has a texel value to be used as the texel value of the second texel.

The general texel data may further include at least one representative value of the texels forming the texel block; and the specific texel data may include weights or indexes of the first texels to be applied to the at least one representative value to obtain texel values of the first pixels.

The compressing may include allotting bits to the general texel data and the specific texel data.

In another general aspect, a method of decompressing a texture includes receiving compressed data obtained by compressing texels forming a texture in units of blocks of texels; obtaining from the compressed data general texel data applicable to all of texels forming the texel block, and specific texel data applicable to only first texels among first texels and second texels into which the texel block is divided; and obtaining texel values of all of the first texels and the second texels based on the general texel data and the specific texel data.

The general texel data may include spatial data representing a spatial relationship between the first texels and the second texels in the texel block.

The spatial data may include a block pattern indicating locations of the first texels and the second texels in the texel block.

The spatial data may include information for each of the second texels indicating which one of the first texels has a texel value to be used as the texel value of the second texel.

The general texel data may further include at least one representative value of the texels forming the texel block; and the specific texel data may include weights or indexes of the first texels to be applied to the at least one representative value to obtain texel values of the first pixels.

The obtaining of the texel values of all of the first texels and the second texels may include obtaining the texel values of the first pixels based on the spatial data, the at least one representative value, and the weights or indexes of the first texels; and obtaining the texel values of the second pixels based on the spatial data and the texel values of the first texels.

The compressed data may include data bits allotted to the general texel data and the specific texel data.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In a layer structure, when one element is disposed "above" or "on" another element, the one element may be disposed directly on the other element, or may be disposed above the other element without contacting the other element.

The terms used in this application have been selected from currently widely used general terms in consideration of the functions described herein. However, the terms may vary according to the intention of one of ordinary skill in the art, legal precedent, and the advent of new technologies. Also, for special cases, meanings of the terms selected by the inventors are described in detail in the application. Accordingly, the terms used in this application are defined based on their meanings in relation to the contents discussed throughout the application, not by their simple meanings.

When a part is described as "including" a certain element, unless specified otherwise, the part may not be construed to exclude another element, and may be construed to include other elements.

Figure 1:
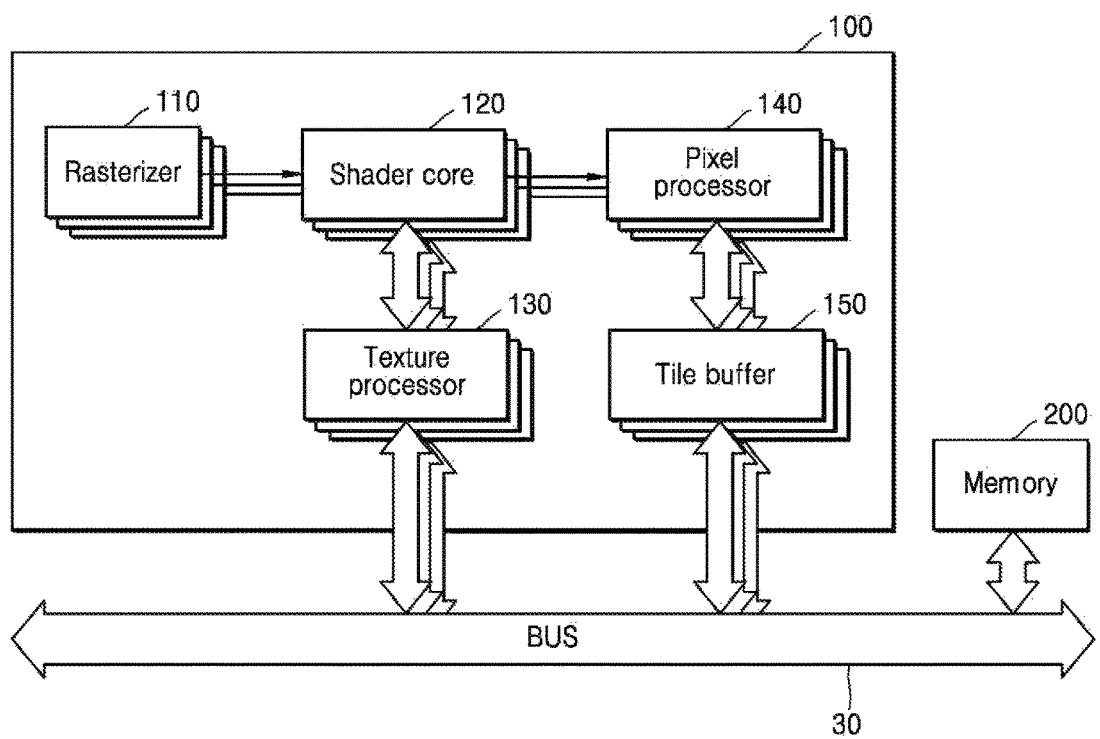
FIG. 1 illustrates an example of a graphics processing unit (GPU).

FIG. 1 illustrates an example of a graphics processing unit (GPU) 100.

Referring to FIG. 1, the GPU 100 includes a rasterizer 110, a shader core 120, a texture processor 130, a pixel processor 140, and a tile buffer 150.

The GPU 100 transmits data to and receives data from a memory 200 outside the GPU 100 via a bus 30.

The GPU 100 of FIG. 1 is a device to process three-dimensional (3D) graphics using a tile-based rendering (TBR) method. For example, the GPU 100 divides a frame into tiles of a certain size, processes the divided tiles in the rasterizer 110, the shader core 120, and the pixel processor 140, and store a processing result in the tile buffer 150. Also, the GPU 100 may process all tiles forming one frame in parallel using the rasterizer 110, the shader core 120, and the pixel processor 140. When all tiles forming one frame are processed, the GPU 100 transmits a processing result stored in the tile buffer 150 to a frame buffer (not shown) in the memory 200.

The shader core 120 includes a pixel shader (not shown) and a vertex shader (not shown). Alternatively, the shader core 120 includes an integrated shader (not shown) that performs the functions of the vertex shader and the pixel shader. Using its vertex shader functionality, the shader core 120 generates a primitive representing an object and outputs the generated primitive to the rasterizer 110.

The rasterizer 110 rasterizes the primitive generated by the vertex shader through a geometric transformation process. Rasterizing the primitive divides the primitive into a plurality of fragments.

The shader core 120 receives the rasterized primitive from the rasterizer 110 and performs pixel shading on the rasterized primitive. The shader core 120 performs the pixel shading to determine colors of the fragments generated through the rasterization. The shader core 120 uses a pixel value generated using the texture to generate vivid 3D graphics in the pixel shading process.

When the shader core 120 requests a pixel value from the texture processor 130, the texture processor 130 transmits a pixel value that was generated by processing the previously prepared texture to the shader core 120. The texture may be stored in memory inside or outside the texture processor 130, or in the memory 200 outside the GPU 100. When the texture used for generating the pixel value requested by the shader core 120 does not exist in the memory inside the texture processor 130, the texture processor 130 retrieves the texture from the memory outside the texture processor 130 or from the memory 200.

The pixel processor 140 determines a pixel value to be finally displayed after performing a process such as a depth test with respect to pixels corresponding to the same position in a tile.

The tile buffer 150 stores final pixel values of a plurality of pixels included in a tile. When the pixel values of all pixels included in a tile are determined, the tile is transmitted to the frame buffer (not shown) in the memory 200.

A process of processing 3D graphics is described in detail with reference to FIG. 2.

Figure 2:
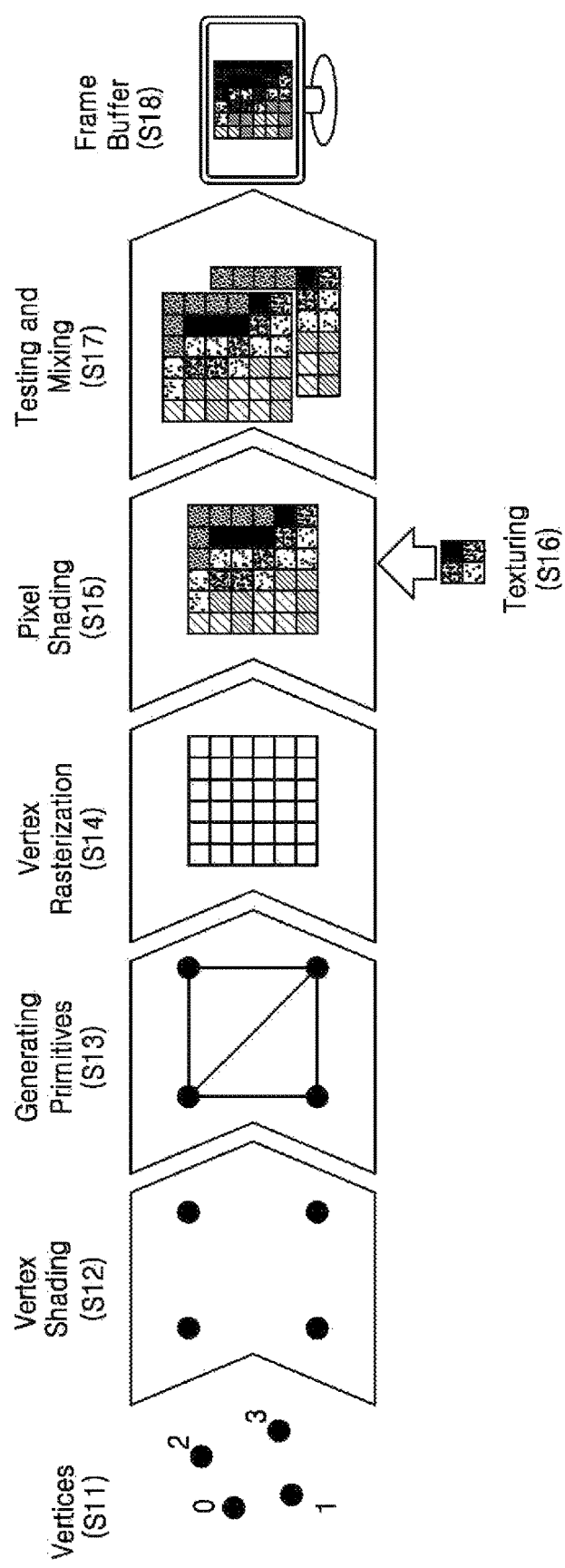
FIG. 2 illustrates an example of a process of processing three-dimensional (3D) graphics in the GPU of FIG. 1.

FIG. 2 illustrates an example of a process of processing 3D graphics in the GPU 100.

Referring to FIG. 2, the process of processing 3D graphics includes operations S11 to S18. The figures in the lower portion of FIG. 2 conceptually indicate processing of a vertex or a pixel in the respective operations.

In the operation S11, vertices representing an image are generated. Vertices are generated to represent objects included in an image.

In the operation S12, shading is performed on the generated vertices. A vertex shader performs shading on the vertices by storing positions of the vertices generated in the operation S11.

In the operation S13, primitives are generated. A primitive is a polygon formed by points, lines, or vertices. For example, primitives may be triangles formed by connecting vertices.

In the operation S14, a primitive is rasterized. Rasterizing a primitive divides the primitive into a plurality of fragments. A fragment is a unit for forming a primitive and is a basic unit for performing image processing. The primitive includes only information about vertices. Accordingly, in the rasterization process, interpolation is performed when fragments between vertices are generated.

In the operation S15, pixel shading is performed. Fragments forming a primitive generated by the rasterization are pixels forming a tile. In the graphics processing field, the terms "fragment" and "pixel" are used interchangeably according to circumstances. For example, a pixel shader may be referred to a fragment shader. In general, a basic unit in graphics processing for forming a primitive is referred to as a fragment, and a basic unit in graphics processing after pixel shading is referred to as a pixel. In the pixel shading, the color of a pixel is determined.

In the operation S16, texturing to determine the color of a pixel is performed. Texturing is a process of determining the color of a pixel using a previously prepared image, that is, a texture, when the color of a pixel is determined. Since calculating the color of each pixel to represent various colors and patterns of the actual world would considerably increase an amount of data and a graphics processing time needed for graphics processing, the color of a pixel is determined using a previously prepared texture. For example, the color of a pixel is determined by storing a surface color of an object in a separate 2D image, that is, a texture, and expanding or contracting the stored texture according to the position and size of the object on a screen, or mixing texel values using textures having various resolutions.

In the operation S17, testing and mixing are performed. A pixel value to be finally displayed is determined through a process such as a depth test performed on pixels corresponding to the same position in a tile, and thus pixel values corresponding to a tile are determined. A plurality of tiles generated through the above processes are mixed with each other, and thus 3D graphics corresponding to a frame are generated.

In the operation S18, the frame generated by the operations S11 to S17 is stored in the frame buffer, and the frame stored in the frame buffer is displayed by a display apparatus.

It is physically impossible to store all textures for various objects and mipmaps corresponding to the textures in a memory in the texture processor 130. To minimize the space needed for storing textures and efficiently transmit the textures, textures are generally compressed for storage and transmission in 3D graphics rendering.

However, a considerable amount of calculations, time, and power consumption are needed to compress a texture and decompress a compressed texture. Accordingly, more efficient compression and decompression methods are needed to compress a texture and decompress a compressed texture.

In a texture compression method and apparatus according to this example, when texels forming a texture are compressed in units of blocks, a calculation process for compression is reduced by performing compression not on all of the texels of a texel block, but only on some texels of the texel block based on a pattern of the texel block. Also, in a texture processing method and apparatus according to this example, some texels that are compressed are decompressed and texel values for the other texels are obtained based on the texel values of the decompressed texels. Accordingly, graphics processing may be efficiently performed.

Figure 3:
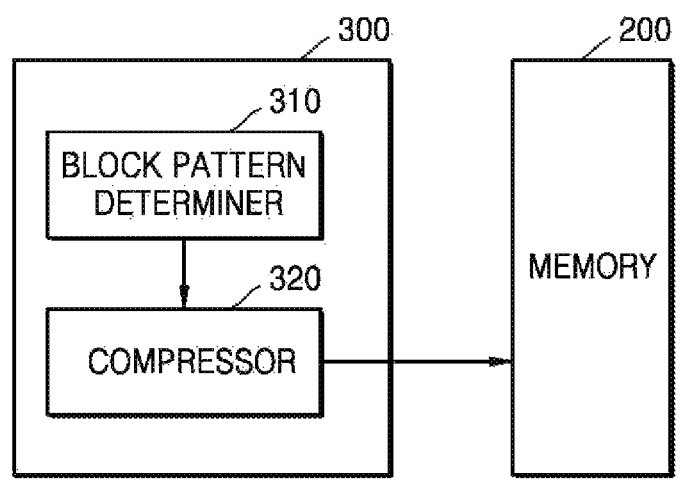
FIG. 3 is a block diagram of an example of a texture compression apparatus.

FIG. 3 is a block diagram of an example of a texture compression apparatus 300.

Referring to FIG. 3, the texture compression apparatus 300 includes a block pattern determiner 310 and a compressor 320.

The block pattern determiner 310 receives a texel block and determines a block pattern of the received texel block. A texel block is obtained by dividing texels forming a texture into units of blocks of texels. The texel block is described below with reference to FIG. 4.

Figure 4:
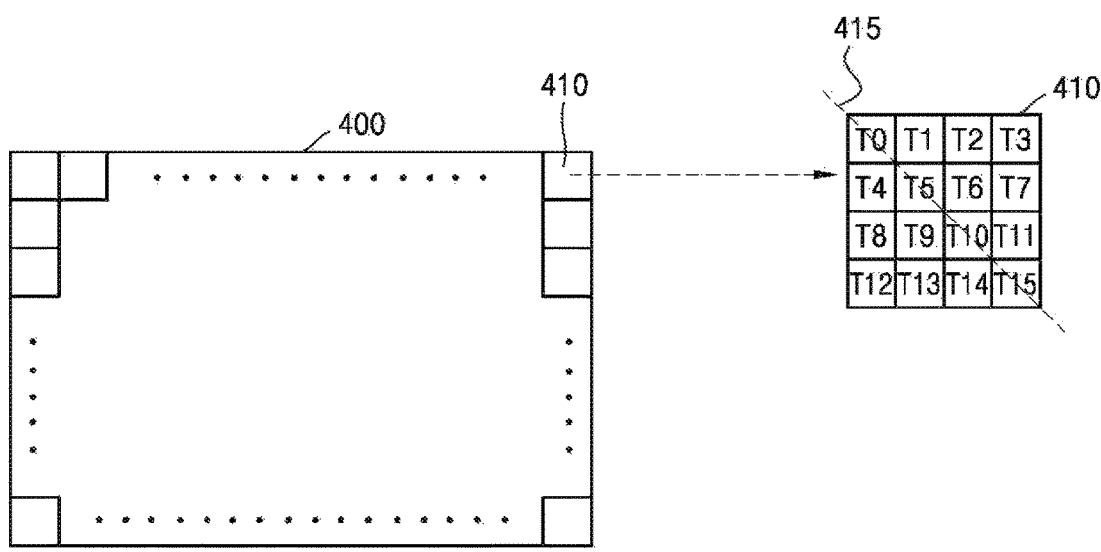
FIG. 4 illustrates an example of a texel block.

FIG. 4 illustrates an example of a texel block.

A texture is stored in a compressed form through the 3D graphics processing process to satisfy demands for hardware resources and a communication environment. The texture compression apparatus 300 generally performs compression on the texels forming a texture in units of blocks of texels.

For example, referring to FIG. 4, a texture 400 includes a plurality of texels, and the texels are divided into texel blocks each having a certain size. Although FIG. 4 illustrates a texel block having a size of 4×4, that is, a 4×4 texel block 410, this is merely an example, and the texel block 410 may have various sizes. However, in the following description, for convenience of explanation, the size of a texel block is described as being 4×4.

Referring to FIG. 4, the 4×4 texel block 410 is formed of 16 texels T0, T1, T2, T3, T4, T5, T6, T7, T8, T9, T10, T11, T12, T13, T14, and T15, and each of the texels T0, T1, T2, T3, T4, T5, T6, T7, T8, T9, T10, T11, T12, T13, T14, and T15 has a texel value.

When the texture 400 is divided into a plurality of texel blocks, texel values included in one texel block, for example, the texel block 410, may have symmetrical properties. For example, the texel values included in the 4×4 texel block 410 may be left-to-right symmetrical with respect to a first diagonal 415. A texel value of a second texel T1 may be the same as a texel value of the fifth texel T4; a texel value of the third texel T2 may be the same as a texel value of the ninth texel T8; a texel value of the fourth texel T3 may be the same as a texel value of the thirteenth texel T12; a texel value of the seventh texel T6 may be the same as a texel value of the tenth texel T9; a texel value of the eighth texel T7 may be the same as a texel value of the fourteenth texel T13; and a texel value of the twelfth texel T11 may be the same as a texel value of the fifteenth texel T14.

In this case, the texture compression apparatus 300 performs compression on only the texels located on the left or right side of the first diagonal line 415 and generates compressed data, for example, a weight or an index of a texel, for those texels. Then, during decompression of a texel block, the compressed data is decompressed to obtain texel values for the texels for which the compressed data was generated, and texel values of texels for which compressed data was not generated are obtained based on the obtained texel values. Accordingly, in a texture compression and decompression method according to this example, since the compression and decompression are not performed on some texels included in a texel block, the amount of calculations, time, and power consumption is reduced.

In a compression method according to this example, a block pattern for classifying texels of a texel block into texels to be compressed and texels not to be compressed is needed. The block pattern is described in detail with reference to FIG. 5.

Figure 5:
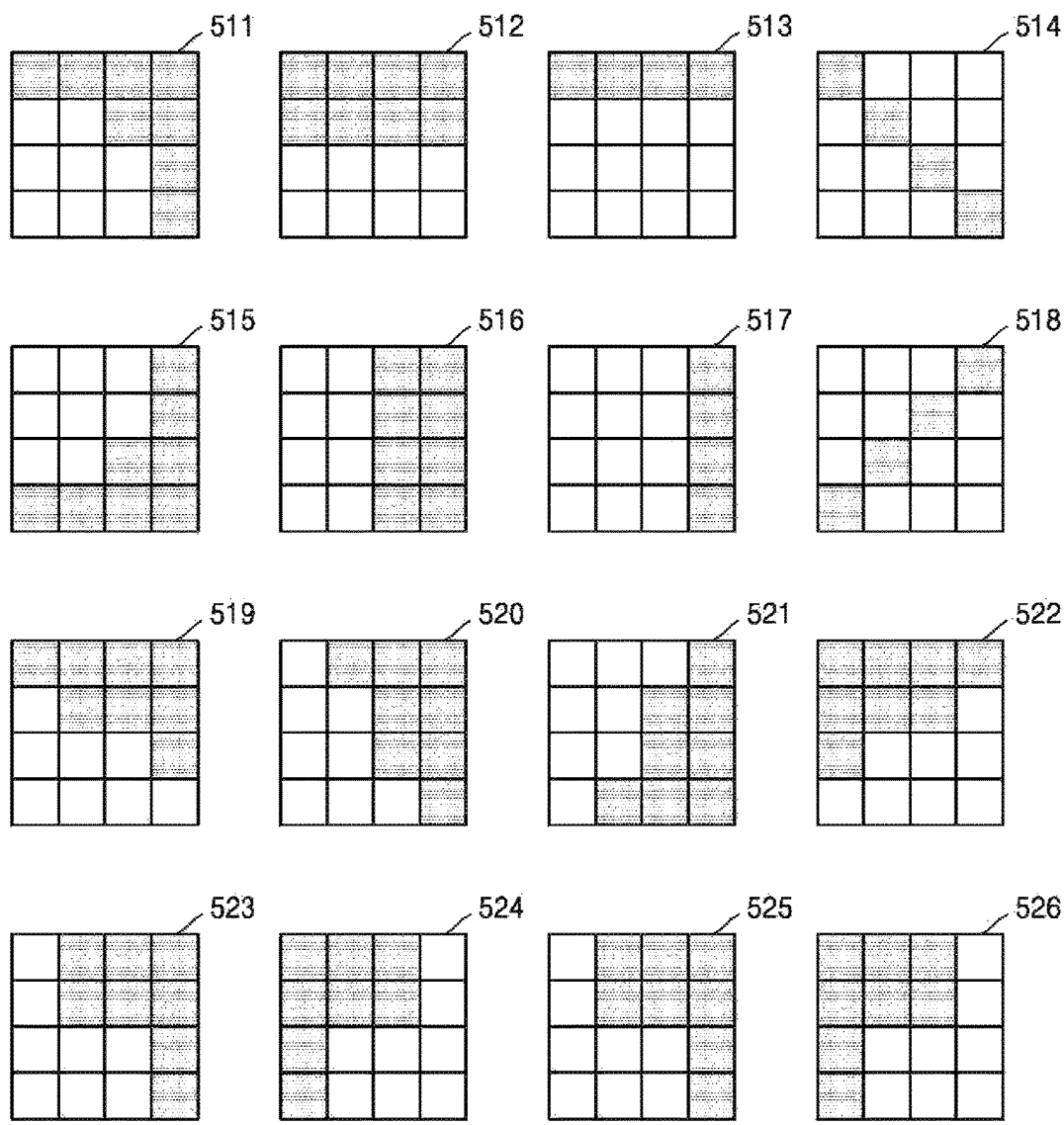
FIG. 5 illustrates examples of block patterns.

FIG. 5 illustrates examples of block patterns.

Referring to FIG. 5, each of block patterns 511, 512, 513, 514, 515, 516, 517, 518, 519, 520, 521, 522, 523, 524, 525, and 526 has the same size as that of a texel block and includes a plurality of areas corresponding to the texels forming the texel block. The areas are divided into first areas that are shaded in gray and second areas that are not shaded, i.e., that are white. The gray areas in each block pattern correspond to the texels to be compressed in the texel block, and the white areas in each block pattern correspond to the texels not to be compressed in the texel block.

In the block patterns 511, 512, 515, 516, 519, 520, 521, 522, 523, 524, 525, and 526, the gray areas and the white areas are symmetrical with respect to a diagonal, horizontal, or vertical line. For these block patterns, as in the example in FIG. 4, the texture compression apparatus 300 performs compression on only the texels corresponding to the gray areas on one side of the diagonal, horizontal, or vertical line, and generates compressed data, for example, a weight or an index of a texel, for those texels. Then, during decompression of a texel block, the compressed data is decompressed to obtain texel values for the texels corresponding to the gray areas for which the compressed data was generated, and texel values of texels corresponding to the white areas on the other side of the diagonal, horizontal, or vertical line for which compressed data was not generated are obtained based on the obtained texel values according to the symmetry of the gray and white areas with respect to the diagonal, horizontal, or vertical line as described with respect to the texel block 410 in FIG. 4.

In the block patterns 513, 514, 517, and 518, the gray areas and the white areas are not symmetrical with respect to a diagonal, horizontal, or vertical line. For these block patterns, the texture compression apparatus 300 performs compression on only the texels corresponding to the gray areas and generates compressed data, for example, a weight or an index of a texel, for those texels. Then, during decompression of a texel block, the compressed data is decompressed to obtain texel values for the texels corresponding to the gray areas for which the compressed data was generated, and texel values of texels corresponding to the white areas for which compressed data was not generated are obtained by interpolating the obtained texel values. For example, assuming that the areas of the block pattern 514 are numbered T0, T1, T2, T3, T4, T5, T6, T7, T8, T9, T10, T11, T12, T13, T14, and T15 as in the texel block 410 in FIG. 4, resulting in the gray areas being numbered T0, T5, T10, and T15, the texture compression apparatus 300 performs compression on only the texels corresponding to the gray areas T0, T5, T10, and T15 and generates compressed data, for example, a weight or an index of a texel, for those texels. Then, during decompression of a texel block, the compressed data is decompressed to obtain texel values for the texels corresponding to the gray areas T0, T5, T10, and T15 for which the compressed data was generated, and texel values of texels corresponding to the white areas T1, T2, T3, T4, T6, T7, T8, T9, T11, T12, T13, and T14 for which compressed data was not generated are obtained by interpolating the obtained texel values of the texels corresponding to the gray areas T0, T5, T10, and T15. One example of interpolating the obtained texel values is T1=(T0+T5)/2, T4=(T0+T5)/2, T6=(T5+T10)/2, T9=(T5+T10)/2, T11=(T10+T15)/2, T14=(T10+T15)/2, T2=(T1+T6)/2, T8=(T4+T9)/2, T7=(T6+T11)/2, T13=(T9+T14)/2, T3=(T2+T7)/2, T12=(T8+T13)/2. However, this is just an example, and other interpolating methods may be used.

Although FIG. 5 illustrates 16 block patterns, this is merely an example, and the block patterns may include a variety of block patterns.

The block pattern determiner 310 determines a block pattern to be used for compressing a texel block among various types of block patterns. The block pattern determiner 310 selects a block pattern that best reflects the symmetrical properties of a texel block to be compressed among the block patterns. For example, the block pattern determiner 310 calculates a difference value between a sum of texel values corresponding to the first areas shaded in gray and a sum of texel values corresponding to the non-shaded second areas for each of the block patterns, and selects a block pattern having a smallest difference value. When a plurality of block patterns having the same smallest difference value are detected, the block pattern determiner 310 may select a block pattern that is first detected. Alternatively, the block pattern determiner 310 selects a block pattern having a difference value that is less than a previously set value. When a plurality of block patterns having the same difference value that is less than a previously set value are detected, the block pattern determiner 310 may select a block pattern that is first detected. Alternatively, the block pattern determiner 310 selects a block pattern according to a user's input. However, the method of determining a block pattern is not limited to the above-described methods, and a block pattern may be determined using a variety of methods.

When a block pattern of a texel block is determined, the compressor 320 compresses the texel block based on the determined block pattern. The compressor 320 performs compression on the texels corresponding to the first areas (gray-shaded areas) and does not perform compression on the texels corresponding to the second areas (non-shaded areas) among the areas included in the block pattern.

The method of compressing a texel block based on a block pattern is described in detail with reference to FIG. 6.

Figure 6:
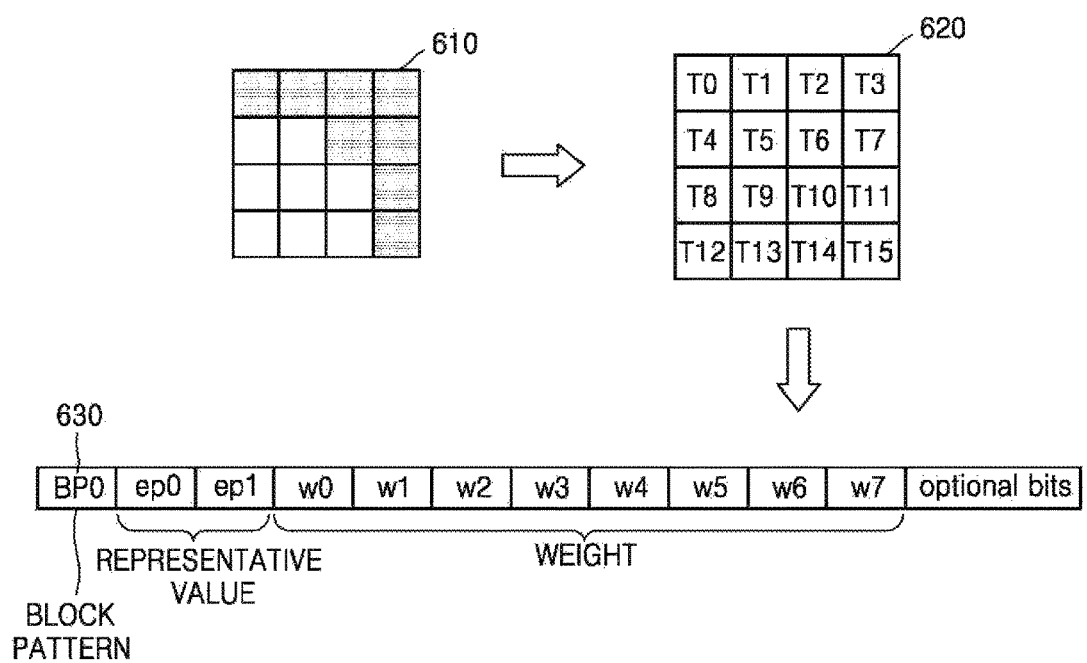
FIG. 6 is a reference drawing for describing an example of a method of compressing a texel block based on a block pattern.

FIG. 6 is a reference drawing for describing an example of a method of compressing a texel block based on a block pattern.

Referring to FIG. 6, the compressor 320 determines at least one representative value of texels forming a texel block. For example, a largest value ep0 and a smallest value ep1 (end point values) of the texel values of the texels forming a texel block are determined to be representative values. However, this is merely an example, and the at least one representative value may be determined using a variety of methods. Furthermore although in this example, two representative values are determined, only one representative value may be determined, or more than two representative values may be determined.

When the at least one representative value is determined, the compressor 320 calculates weights of some of the texels forming a texel block with respect to the at least one representative value. A weight of a texel is a weight applied to the at least one representative value to represent a texel value using the at least one representative value. For example, when T (texel value)=w0*ep0 (first representative value)+(1−w0)*ep1 (second representative value), w0 is a weight.

The compressor 320 determines some texels whose weights are to be calculated based on a determined block pattern 610. For example, weights are calculated with respect to only the texels (first texels) corresponding to the areas shaded in gray among the areas included in the determined block pattern 610. For example, the compressor 320 calculates weights of a first texel T0, a second texel T1, a third texel T2, a fourth texel T3, a seventh texel T6, an eighth texel T7, a twelfth texel T11, and a sixteenth texel T15 in a 4×4 texel block 620.

The compressor 320 generates compressed data 630 including a block pattern of a texel block, at least one representative value of the texels forming the texel block, and weights of some of the texels forming the texel block.

Referring to FIG. 6, the compressed data 630 for the 4×4 texel block 620 includes data BP0 indicating the block pattern 610, data ep0 and ep1 indicating at least one representative value of the texels forming the 4×4 texel block 620, and data w0, w1, w2, w3, w4, w5, w6, w7 indicating weights of some of the texels of the 4×4 texel block 620 (texels T0, T1, T2, T3, T6, T7, T11, and T15).

Alternatively, although not illustrated, the compressor 320 generates compressed data including indexes of some of the texels forming a texel block instead of the weights of some of the texels forming the texel block. For example, an index is data to select any one of a plurality of previously calculated point color values. The point color values may be calculated based on at least one representative value of the texels forming the texel block. The at least one representative value may include the largest value ep0 and the smallest value ep1 (end point values) of the texel values of the texels forming a texel block as in the example described above. Also, the point color values may be calculated by a variety of methods. One example of calculating four point color values is Point Color 0=ep0, Point Color 1=ep0*(¼)+ep1*(¾), Point Color 2=ep0*(¾)+ep1*(¼), Point Color 3=ep1. One example of calculating eight color point values is Point Color 0=ep0, Point Color 1=ep0*(⅛)+ep1*(⅞), Point Color 2=ep0*(⅞)+ep1*(⅝), Point Color 3=ep0*(⅜)+ep1*(⅝), Point Color 4=ep0*(4/8)+ep1*(4/8), Point Color 5=ep0*(⅝)+ep1*(⅜), Point Color 6=ep0*(⅝)+ep1*(⅞), Point Color 7=ep1. However, these are just examples, and other methods of calculating color point values may be used.

For example, when a number of bits allotted to an index is 2 bits, one of 4 point color values may be selected and a texel has a point color value selected according to the index.

The compressor 320 determines some texels whose indexes are to be calculated based on a block pattern, and calculates indexes of the determined texels only. Accordingly, the compressed data for the 4×4 texel block 620 includes data indicating a block pattern, data indicating at least one representative value, and data indicating indexes of some texels.

When there are 16 types of a block pattern as illustrated in FIG. 5, 4 bits are allotted to the data BP0 indicating a block pattern. Also, 8 bits are allotted to the data indicating one representative value (end point), and 2 bits are allotted to the data indicating one weight or index.

When weights or indexes are calculated for all of the texels included in the 4×4 texel block 620 without using the block pattern 610, and the calculated weights or indexes are included in the compressed data, 32 bits (=2 bits×16) are used for the weights or indexes. In contrast, as described in FIG. 6, when weights or indexes are calculated only for 8 of 16 texels included in the 4×4 texel block 620 based on the block pattern 610, and the calculated weights or indexes are included in the compressed data, 16 bits (=2 bits×8) are used for the weights or indexes. Accordingly, the number of bits used for the compressed data is reduced by 12 bits, that is, the 16 bits that are saved by calculating weights or indexes for only 8 texels less the 4 bits for the block pattern that is required when weights or indexes are calculated for only 8 texels.

The compressor 320 may increase the number of representative values by allotting additional bits corresponding to the bits that are saved when the weights or indexes of the other texels T4, T5, T8, T9, T10, T12, T13, and T14 are not calculated to the data bits indicating the at least one representative value. Alternatively, the number of types of a block pattern may be increased by allotting the additional bits to the data bits indicating the block pattern. Alternatively, the additional bits may be allotted to the data bits indicating the weights or indexes of some texels to increase a number of values that can be represented by the weights or indexes of some texels. Alternatively, the additional bits may be allocated to any combination of any two or more of the data bits indicating the at least one representative value, the data bits indicating the block pattern, and the data bits indicating the weights or indexes of some texels.

When the number of representative values are increased or the number of types of a block pattern is increased or the number of values that can be represented by the weights or indexes of some texels is increased by allotting the additional bits, a difference between the original texture and a texture obtained by decompressing a texel block may be reduced.

Also, although FIG. 6 illustrates the compression of a texel block by calculating weights or indexes of only some of the texels included in a texel block based on the block pattern 610, if an appropriate block pattern for compressing a texel block among various types of block patterns is not detected, the texture compression apparatus 300 calculates weights of indexes of all of the texels included in the texel block. In this case, the compressed data includes data indicating at least one representative value and data indicating weights or indexes of all of the texels included in the texel block.

The texture compression apparatus 300 stores the compressed data in the memory 200.

Figure 7:
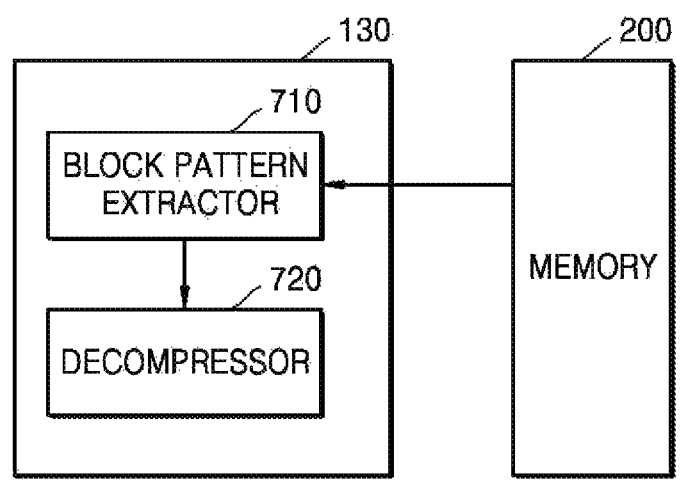
FIG. 7 is a block diagram of an example of a texture processor.

FIG. 7 is a block diagram of an example of the texture processor 130.

Referring to FIG. 7, the texture processor 130 includes a block pattern extractor 710 and a decompressor 720.

The block pattern extractor 710 receives compressed data of a texel block from a memory inside or outside the texture processor 130, or the memory 200 outside the GPU 100, and extracts a block pattern included in the compressed data. For example, the block pattern extractor 710, as illustrated in FIG. 8, extracts a block pattern 810 by decoding data BP0 indicating a block pattern included in compressed data 830.

The decompressor 710 decompresses the received compressed data based on the extracted block pattern and obtains texel values of texels forming a texel block. A method of obtaining texel values as the decompressor 710 decompresses the compressed data is described in detail with reference to FIG. 8.

Figure 8:
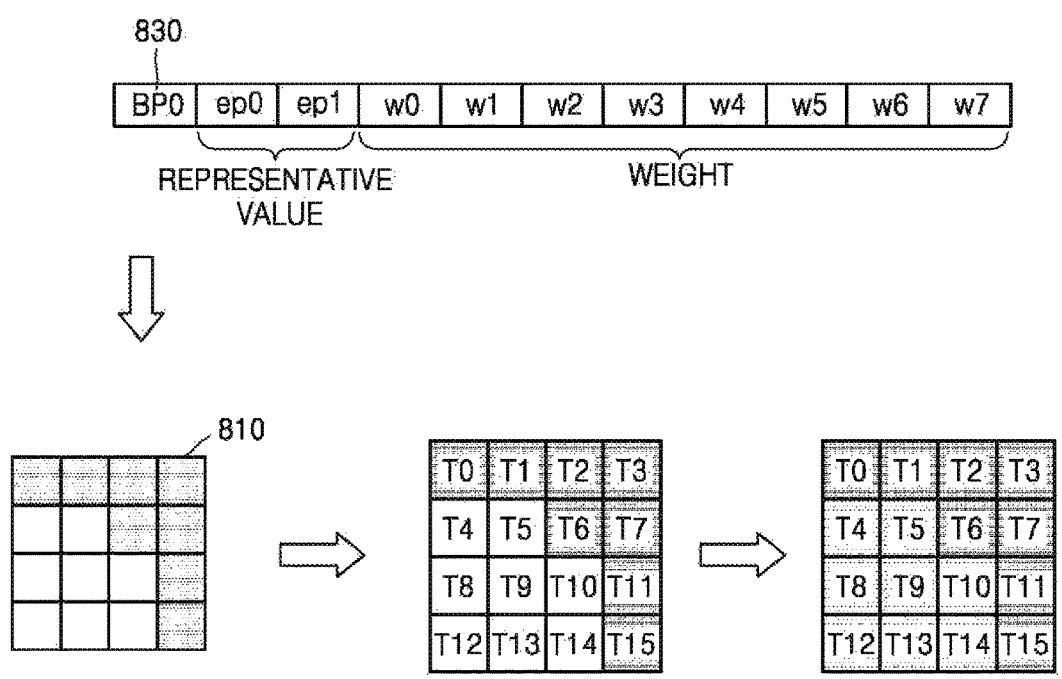
FIG. 8 is a reference drawing for describing an example of a method of decompressing compressed data in the texture processor illustrated in FIG. 7.

FIG. 8 is a reference drawing for describing an example of a method of decompressing compressed data in the texture processor 130 illustrated in FIG. 7.

Referring to FIG. 8, the decompressor 710 decodes data indicating at least one representative value included in compressed data and data indicating weights or indexes, and obtains the at least one representative value of the texels forming the texel block and a weight or index of each of some texels included in a texel block. In the following description, a case in which data indicating weights is included in the compressed data is described as an example.

For example, the decompressor 710 includes a representative value parser (not shown) to decode data ep0 and ep1 indicating the at least one representative value included in the compressed data 830, and includes a weight parser (not shown) to decode data w0, w1, w2, w3, w4, w5, w6, and w7 indicating weights included in the compressed data. Accordingly, the decompressor 710 obtains at least one representative value of the texels forming the texel block and a weight of each of some texels included in the texel block.

The decompressor 710 calculates texel values of texels T0, T1, T2, T3, T6, T7, T11, and T15 forming a texel block based on the block pattern of the texel block, the at least one representative value of the texels forming the texel block, and the weight of each of some texels included in the texel block. In detail, the decompressor 710 includes an interpolation unit (not shown) to perform interpolation using the at least one representative value and the weights, and generates texel values of the texels T0, T1, T2, T3, T6, T7, T11, and T15 forming the texel block. For example, a texel value of the first texel T0 is calculated using representative values ep0 and ep1 and a weight w0 of the first texel T0 according to the equation T0=w0*ep0+(1−w0)*ep1. Also, the decompressor 710 may include a plurality of interpolation units to process a plurality of texel values in parallel.

Also, when the compressed data includes data indicating indexes rather than weights, the decompressor 710 decodes the compressed data and obtains indexes of some of the texels forming a texel block. The decompressor 710 determines texel values of some texels using indexes. For example, for each of some texels, a point color value selected according to an index is determined to be a texel value.

After texel values of some texels T0, T1, T2, T3, T6, T7, T11, and T15 (first texels) are calculated, the decompressor 710 calculates texel values of the other texels T4, T5, T8, T9, T10, T12, T13, and T14 (second texels) based on the extracted block pattern.

The decompressor 710 replicates a texel value of any one of the first texels as a texel value of any one of the second texels. In this case, the block pattern 810 includes information about which texel value of any one of the first texels is to be replicated as which texel value of any one of the second texels. For example, when the block pattern 810 indicates that the first texel T0 of the first texels is mapped to the sixth texel T5 of the second texels, a texel value of the first texel T0 is replicated as a texel value of the sixth texel T5.

Alternatively, the decompressor 710 calculates texel values of the second texels by interpolating texel values of the first texels. However, these are merely examples, and the decompressor 710 may calculate texel values of the second texels using a variety of methods.

The decompressor 710 outputs the obtained texel values to the shader core 120.

Figure 9:
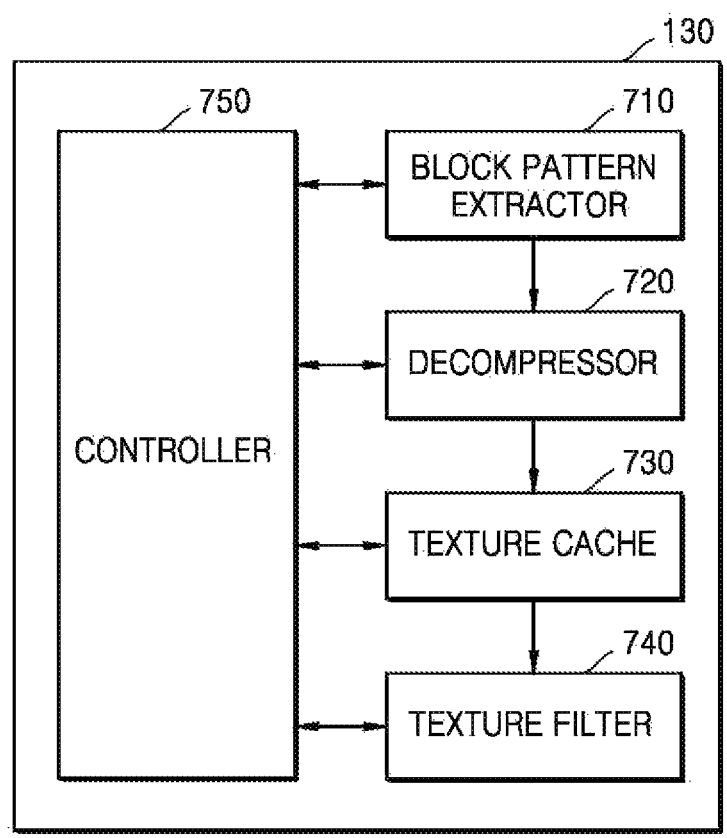
FIG. 9 is a block diagram of another example of a texture processor.

FIG. 9 is a block diagram of another example of a texture processor.

Referring to FIG. 9, the texture processor 130 includes a controller 750, the block pattern extractor 710, the decompressor 720, a texture cache 730, and a texture filter 740. Since the block pattern extractor 710 and the decompressor 720 were already described above with respect to FIGS. 7 and 8, the descriptions have been omitted in the description of FIG. 9 to avoid redundancy.

The controller 750 controls an overall operation of the texture processor 130 and a signal flow between internal constituent elements of the texture processor 130, and performs a data processing function.

Referring to FIG. 1, the shader core 120 requests a texel needed for pixel processing from the texture processor 130. Accordingly, the controller 750 receives a texel address of a texel requested by the shader core 120. The controller 750 first determines whether the requested texel is stored in the texture cache 730. When the requested texel is not stored in the texture cache 730, the controller 750 requests compressed data about a texel block including the requested texel from a memory outside the texture processor 130 or the memory 200 outside the GPU 100.

Accordingly, the texture processor 130 receives compressed data from the memory 200 outside the GPU 100.

The block pattern extractor 710 extracts a block pattern of the texel block based on the received compressed data.

The decompressor 720 obtains at least one representative value of the texels forming the texel block and weights of some texels based on the received compressed texel block.

The decompressor 720 calculates texel values of some texels based on the obtained at least one representative value of the texels forming the texel block and the weights of some texels. Also, the decompressor 720 calculates texel values of the other texels based on the calculated texel values of some texels and the extracted block pattern.

The texture cache 730 stores texel values of the decompressed texels. Although FIG. 9 illustrates that the decompressor 720 decompresses the compressed data and the obtained texel values are stored in the texture cache 730, the texel values may be stored in the texture cache 730 in the form of compressed data without being decompressed. When the compressed data stored in the texture cache 730 is requested, the decompressor 720 decompresses the requested compressed data and generates texel values.

The texture filter 740 performs texture filtering using the texel values generated by the decompressor 720 decompressing the compressed data. Filtering the texel values obtains a color value corresponding to a pixel by blending the texel values. For example, the color value corresponding to a pixel is obtained by obtaining an average value of the texel values included in a partial area of a texture space indicated by the texel address of the texel requested from the texture processor 130. The texel value filtered by the texture filter 740 is transmitted to the shader core 120 in response to the request of the shader core 120. A texture filtering method performed by the texture filter 740 may be any one of various filtering methods, such as a trilinear filtering method.

Figure 10:
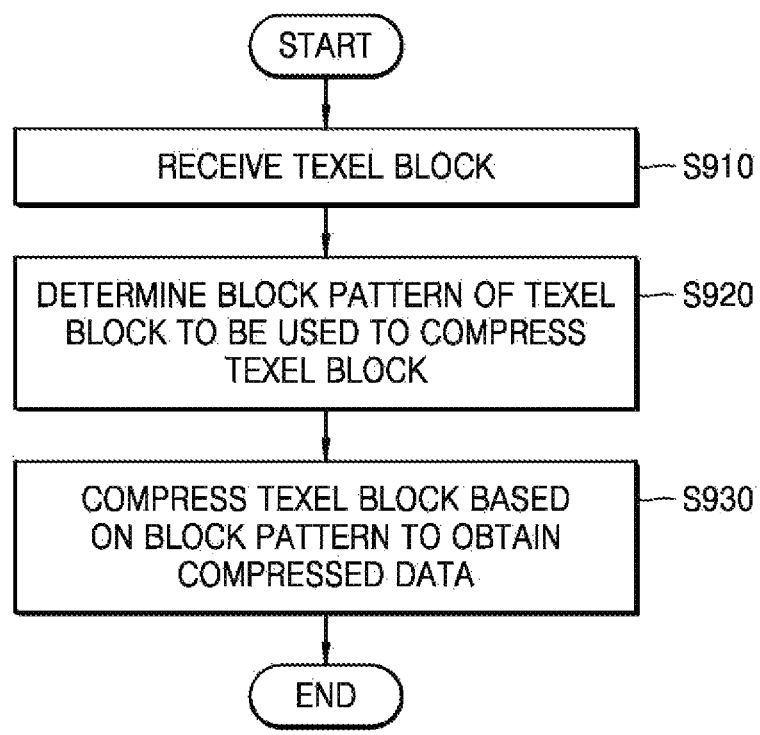
FIG. 10 is a flowchart of an example of a method of compressing a texel block.

FIG. 10 is a flowchart of an example of a method of compressing a texel block.

Referring to FIG. 10, the texture compression apparatus 300 receives a texel block (S910).

A texel block is obtained by dividing texels forming a texture into units of blocks of texels. A texel block may have a variety of sizes. When a texture is divided into texel blocks, texel values included in one texel block may have symmetrical properties.

The texture compression apparatus 300 determines a block pattern of the texel block to be used to compress the texel block (S920).

A block pattern is a pattern to classify texels forming a texel block into texels to be compressed and texels not to be compressed.

For example, a block pattern includes a plurality of areas corresponding to the texels forming a texel block, and the areas are divided into first areas shaded in gray and second areas that are not shaded. The first areas correspond to the texels to be compressed in a texel block, and the second areas correspond to the texels not to be compressed in the texel block. However, this is merely an example, and the first areas may correspond to the texels not to be compressed and the second areas may correspond to the texels to be compressed.

The texture compression apparatus 300 determines a block pattern to be used for compressing an input texel block among the block patterns. The texture compression apparatus 300 selects a block pattern that best reflects the symmetrical properties of the texel block among the block patterns. For example, the texture compression apparatus 300 calculates a difference value between a sum of texel values corresponding to the first areas and a sum of texel values corresponding to the second areas for each of the block patterns, and selects a block pattern having a smallest difference value.

The texture compression apparatus 300 compresses the texel block based on the determined block pattern to obtain compressed data (S930).

The operation S930 of FIG. 10 is described in detail with reference to FIG. 11.

Figure 11:
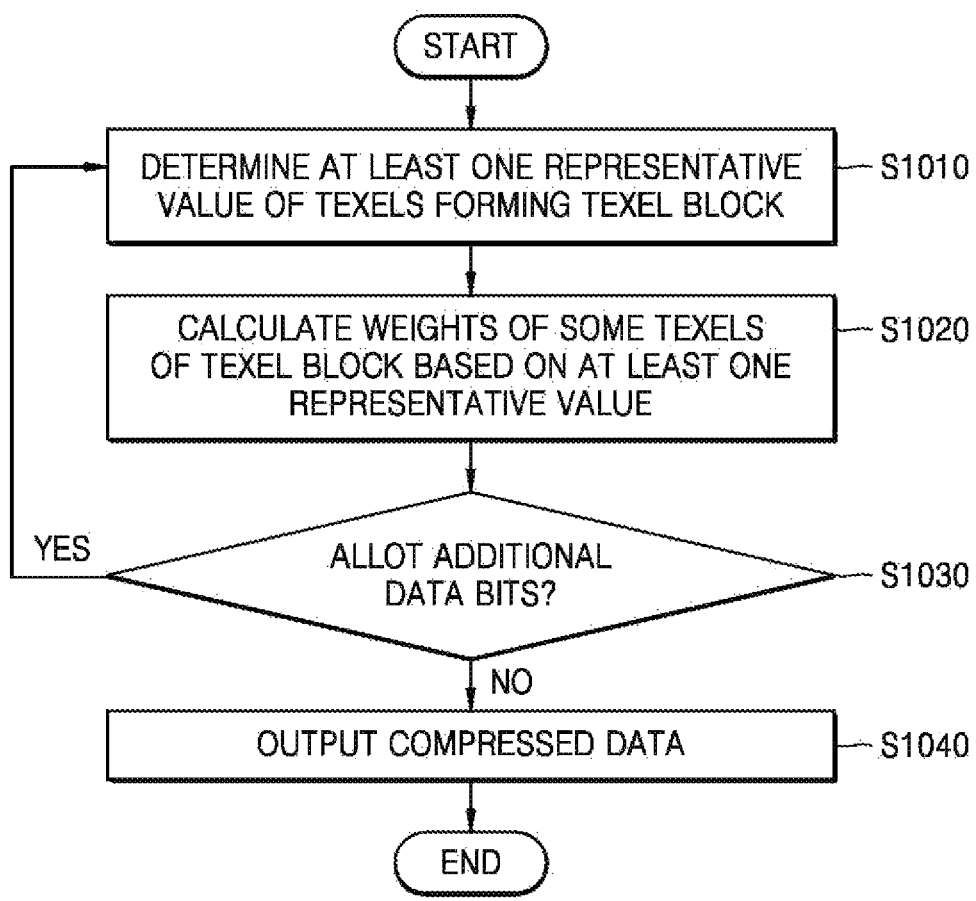
FIG. 11 is a flowchart of an example of an operation of compressing a texel block based on a block pattern of FIG. 10.

FIG. 11 is a flowchart of an example of the operation S930 of FIG. 10.

Referring to FIG. 11, the texture compression apparatus 300 determines at least one representative value of texels forming a texel block (S1010).

For example, the texture compression apparatus 300 determines the largest value and the smallest value, that is, end point values, of texel values of texels forming a texel block to be representative values. However, this is merely an example, and the at least one representative value may be determined using a variety of methods.

When the at least one representative value is determined, the texture compression apparatus 300 calculates weights of some of the texels forming a texel block based on the at least one representative value (S1020).

A weight of a texel is a weight applied to at least one representative value to represent a texel value. For example, when T (texel value)=w0*ep0 (first representative value)+w1*ep1 (second representative value), w0 and w1 are weights. The texture compression apparatus 300 determines some texels whose weights are to be calculated based on the determined block pattern. For example, among the areas included in the determined block pattern, weights are calculated only for texels corresponding to the areas shaded in gray (first areas). The texture compression apparatus 300 generates compressed data including a block pattern of a texel block, at least one representative value of the texels forming the texel block, and weights of some of the texels forming the texel block.

Also, the texture compression apparatus 300 determines whether to allot additional data bits (S1030).

When only the weights of some of texels forming a texel block are calculated and included in the compressed data, bits corresponding to the weights of the other texels are not needed, reducing a number of data bits to be included in the compressed data. The texture compression apparatus 300 determines whether to allot additional bits equal in number to the bits that are not needed to any one or any combination of any two or more of data bits indicating a block pattern, data bits indicating at least one representative value, and data bits indicating the weights of some texels. When the additional data bits are determined to be allotted, the operations S1010 and S1020 are performed again, or the operation S920 of FIG. 10 is performed again.

The texture compression apparatus 300 outputs the compressed data to the memory 200 (S1040), and the memory 200 stores the compressed data.

Figure 12:
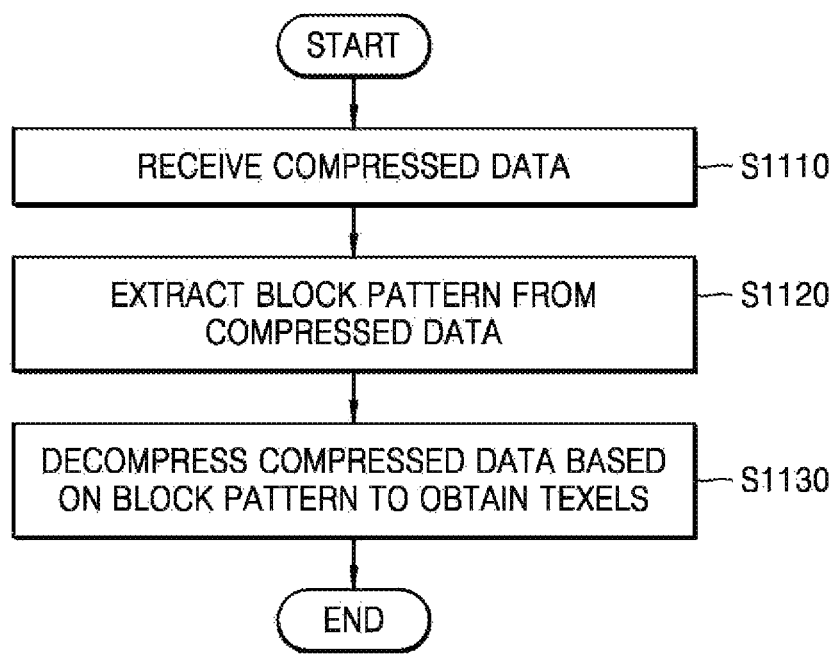
FIG. 12 is a flowchart of an example of a method of decompressing a texel block.

FIG. 12 is a flowchart of an example of a method of decompressing a texel block.

Referring to FIG. 12, the texture processor 130 receives compressed data (S1110). For example, the texture processor 130 receives compressed data obtained by compressing a texel block from a memory inside or outside the texture processor 130, or the memory 200 outside the GPU 100.

The texture processor 130 extracts a block pattern included in the compressed data (S1120). For example, the texture processor 130 extracts a block pattern by decoding data indicating a block pattern included in the compressed data.

The texture processor 130 obtains texel values of the texels forming a texel block by decompressing the received compressed data based on the block pattern (S1130).

Operation S1130 of FIG. 12 is described in detail with reference to FIG. 13.

Figure 13:
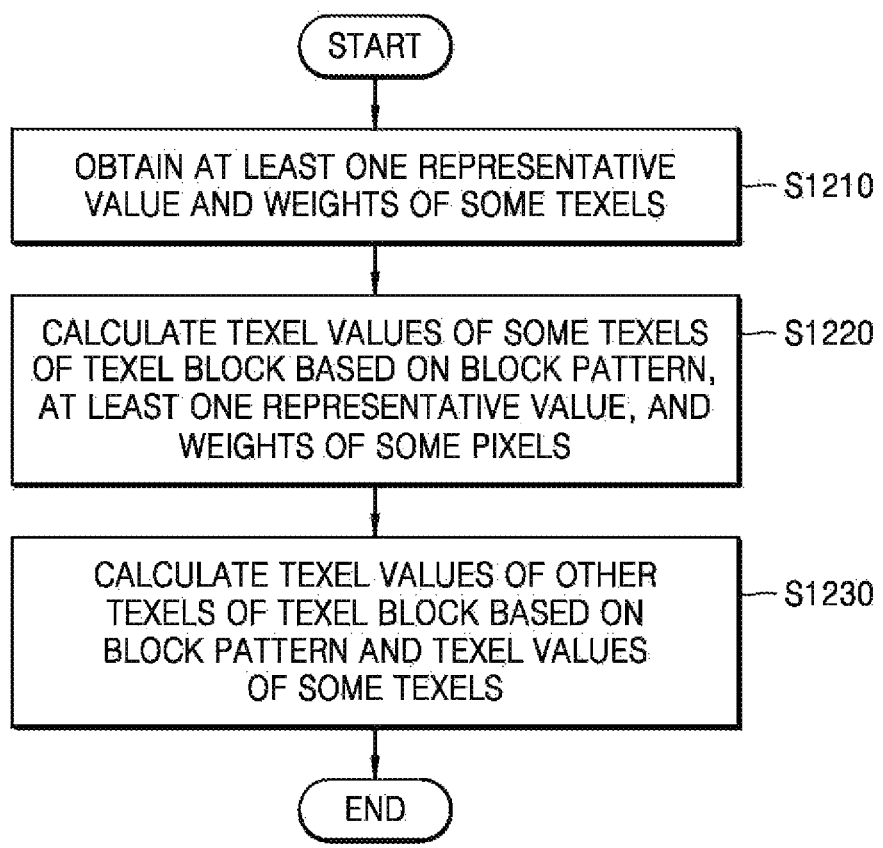
FIG. 13 is a flowchart of an example of an operation of decompressing compressed data based on a block pattern to obtain texels of FIG. 12.

FIG. 13 a flowchart of an example of the operation S1130 of FIG. 12.

Referring to FIG. 13, the texture processor 130 obtains at least one representative value of the texels forming the texel block and a weight of each of some texels included in the texel block by decoding the data indicating the at least one representative value and the data indicating the weights included in the compressed data (S1210).

The texture processor 130 calculates texel values of some texels (first texels) forming the texel based on the block pattern of the texel block, the at least one representative value and, the weight of each of the some texels included in the texel block (S1220).

After the texel values of the some texels (first texels) are calculated, the texture processor 130 calculates texel values of the other texels (second texels) based on the block pattern (S1230).

For example, the texture processor 130 replicates a texel value of any one of the first texels as a texel value of any one of the second texels. In this case, the block pattern includes information about which texel value of any one of the first texels is replicated as which texel value of any one of the second texels. For example, when the block pattern indicates that a first texel of the first texels is mapped to a sixth texel of the second texels, a texel value of the first texel is replicated as a texel value of the sixth texel.

Alternatively, the texture processor 130 calculates texel values of the second texels by interpolating texel values of the first texels. However, these are merely examples, and the texture processor 130 may calculate texel values of the second texels using a variety of methods.

Accordingly, the texture processor 130 obtains texel values of all of the texels forming the texel block.

The GPU 100, the rasterizer 110, the shader core 120, the texture processor 130, the pixel processor 140, the tile buffer 150, and the memory 200 in FIG. 1, the texture compression apparatus 300, the block pattern determiner 310, the compressor 320, and the memory 200 in FIG. 3, the texture processor 130, the block pattern extractor 710, the decompressor 720, and the memory 200 in FIG. 7, and the texture processor 130, the block pattern extractor 710, the decompressor 720, the texture cache 730, the texture filter 740, and the controller 750 in FIG. 9 that perform the operations described herein with respect to FIGS. 1-13 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-13. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 9-13 that perform the operations described herein with respect to FIGS. 1-13 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of compressing a texture, the method comprising:
    executing, by a processor, operations comprising:
    receiving a texel block obtained by dividing texels forming a texture into units of blocks of texels;
    determining a block pattern of the texel block, wherein the block pattern is a pattern for classifying the texels forming the texel block into first texels and second texels, and the texels forming the texel block have symmetrical properties in the block pattern; and
    compressing the texel block based on the block pattern,
    wherein the determining the block pattern of the texel block comprises calculating a difference value between texel values of the first texels and texel values of the second texels for each of a plurality of block patterns; and determining a block pattern having a smallest difference value among the plurality of block patters to be the block pattern of the texel block, and
    wherein the block pattern comprises information about which texel value of any one of the first texels is replicable as which texel value of any one of the second texels.

2. The method of claim 1, wherein the block pattern is a pattern for classifying texels forming the texel block into the first texels whose weights or indexes are to be calculated and the second texels whose weights or indexes are not to be calculated.

3. The method of claim 2, wherein the compressing of the texel block comprises:
    determining at least one representative value of the texels forming the texel block; and
    calculating weights or indexes of the first texels based on the at least one representative value.

4. The method of claim 3, wherein the compressing of the texel block further comprises generating compressed data comprising the block pattern, the at least one representative value, and the weights or indexes of the first texels.

5. The method of claim 4, wherein the generating of the compressed data comprises generating the compressed data by:

allotting data bits to indicate the block pattern, the at least one representative value, and the weights or indexes of the first texels; and allotting additional data bits that would have been allotted to indicate weights or indexes of at least some of the second texels had the weights or indexes of the second texels been calculated to any one or any combination of any two or more of the data bits indicating the block pattern, the data bits indicating the at least one representative value, and the data bits indicating the weights or indexes of the first texels.

6. A non-transitory computer-readable storage medium storing instructions that, when executed by the processor, cause the processor to perform the method of claim 1.

7. A method of processing a texture, the method comprising:

executing, by a processor, operations comprising:

receiving compressed data obtained by compressing texels forming a texture in units of blocks of texels;

extracting a block pattern included in the compressed data, wherein the block pattern is a pattern for classifying the texels forming the texel block into first texels and second texels; and obtaining texels forming a texel block by decompressing the compressed data based on the block pattern, wherein the texels forming the texel block have symmetrical properties in the block pattern, and wherein the decompressing comprises obtaining, based on the block pattern, texel values of the first texels, and obtaining texel values of at least some of the second texels by replicating the texel values obtained for corresponding ones of the first texels.

8. The method of claim 7, wherein the compressed data includes data for the first texels provided in compressed form.

9. The method of claim 7, wherein the obtaining of the texels comprises:

obtaining at least one representative value of the texels forming the texel block and weights or indexes of the first texels based on the compressed data;

obtaining texel values of the first texels based on the block pattern, the at least one representative value, and the weights or indexes of the first texels; and obtaining texel values of one or more other second texels based on the block pattern and the texel values of the first texels through interpolation.

10. A non-transitory computer-readable storage medium storing instructions that, when executed by the processor, cause the processor to perform the method of claim 7.

11. An apparatus for compressing a texture, the apparatus comprising:

computing hardware comprising:

a block pattern determiner configured to receive a texel block obtained by dividing texels forming a texture into units of blocks of texels, and determine a block pattern of the texel block, wherein the bock pattern is a pattern for classifying the texels forming the texel block into first texels and second texels, and the texels forming the texel block have symmetrical properties in the bock pattern; and a compressor configured to compress the texel block based on the block pattern, wherein the block pattern determiner is further configured to calculate a difference value between texel values of the first texels and texel values of the second texels for each of a plurality of block patterns, and determine a bock pattern having a smallest difference value among the plurality of block patterns to be the block pattern of the texel block, and wherein the block pattern comprises information about which texel value of any one of the first texels is replicable as which texel value of any one of the second texels.

12. The apparatus of claim 11, wherein the block pattern is a pattern for classifying texels forming the texel block into the first texels whose weights or indexes are to be calculated and the second texels whose weights or indexes are not to be calculated.

13. The apparatus of claim 12, wherein the compressor is further configured to determine at least one representative value of the texels forming the texel block, and calculate weights or indexes of the first texels based on the at least one representative value.

14. The apparatus of claim 13, wherein the compressor is further configured to generate compressed data comprising the block pattern, the at least one representative value, and the weights or indexes of the first texels.

15. The apparatus of claim 14, wherein the compressor is further configured to generate the compressed data by:

allotting data bits to indicate the block pattern, the at least one representative value, and the weights or indexes of the first texels, and allotting additional data bits that would have been allotted to indicate weights or indexes of at least some of the second texels had the weights or indexes of the second texels been calculated to at least one of the data bits indicating the block pattern, the data bits indicating the at least one representative value, and the data bits indicating the weights or indexes of the first texels.

16. A texture processor comprising:

computing hardware comprising:

a block pattern extractor configured to receive compressed data obtained by compressing texels forming a texture in units of blocks of texels, and extract a block pattern included in the compressed data, wherein the block pattern is a patter for classifying the texels forming the texel block into first texels and second texels; and a decompressor configured to obtain texels forming a texel block by decompressing the compressed data based on the block pattern, wherein the texels forming the texel block have symmetrical properties in the block pattern, and wherein the decompressor is further configured to obtain, based on the block pattern, texel values of the first texels, aid obtain texel values of at least some of the second texels by replicating the texel values obtained for corresponding ones of the first texels.

17. The texture processor of claim 16, wherein the compressed data includes data for the first texels provided in compressed form.

18. The texture processor of claim 16, wherein the decompressor is further configured to:

obtain at least one representative value of the texels forming the texel block and weights or indexes of the first texels based on the compressed data, obtain texel values of the first texels based on the block pattern, the at least one representative value, and the weights or indexes of the first texels, and obtain texel values of one or more other second texels based on the block pattern and the texel values of the first texels through interpolation.

* * * * *